United States Patent [19]

Dore et al.

[11] Patent Number: 4,780,295

[45] Date of Patent: Oct. 25, 1988

[54] PROCESS FOR PURIFYING PHOSPHORIC ACID

[75] Inventors: Jeffrey C. Dore, Frazer; David P. Brochu, Stroudsburg, both of Pa.; Richard E. Hall, Trenton, N.J.

[73] Assignee: FMC Corporation, Philadelphia, Pa.

[21] Appl. No.: 69,991

[22] Filed: Jul. 6, 1987

[51] Int. Cl.$^4$ .............................................. C01B 25/16
[52] U.S. Cl. ............................ 423/321 S; 423/321 R
[58] Field of Search ................. 423/321 R, 321 S, 320

[56] References Cited

U.S. PATENT DOCUMENTS

| | | | |
|---|---|---|---|
| 1,968,544 | 7/1934 | Vana | 23/165 |
| 3,410,656 | 11/1968 | Bunin et al. | 23/165 |
| 3,607,029 | 9/1971 | Goret et al. | 23/165 |
| 3,700,415 | 10/1972 | Koerner et al. | 23/312 |
| 3,767,769 | 10/1973 | Windand et al. | 23/312 |
| 3,872,215 | 3/1975 | Cherdron et al. | 423/321 S |
| 3,993,736 | 11/1976 | Irani | 423/321 S |
| 4,018,869 | 4/1977 | Beltz et al. | 423/321 S |
| 4,207,302 | 6/1980 | Smith | 423/321 S |
| 4,225,568 | 9/1980 | Leveque | 423/321 S |
| 4,377,562 | 3/1983 | Hiraga et al. | 423/321 S |
| 4,394,361 | 7/1983 | Berkowitz et al. | 423/321 S |
| 4,543,239 | 9/1985 | Jacobs | 423/321 S |
| 4,556,548 | 12/1985 | Gradl et al. | 423/321 S |
| 4,596,703 | 6/1986 | Gradi et al. | 423/321 S |
| 4,640,824 | 2/1987 | Schimmel et al. | 423/185 |

FOREIGN PATENT DOCUMENTS

| | | | |
|---|---|---|---|
| 1326911 | 8/1973 | United Kingdom | 423/321 S |
| 1593970 | 7/1981 | United Kingdom | 423/321 S |

OTHER PUBLICATIONS

"Purifying Wet-Process Phosphoric Acid", Phosphorus and Potassium No. 139, Sep.-Oct. 1985, pp. 34-39.
Kirk-Othmer, "Encyclopedia of Chemical Technology", Third Ed., vol. 17, pp. 434-437.
McKetta et al., "Encyclopedia of Chemical Processing and Design", Marcel Dekker, Inc., N.Y. 1984, vol. 21, pp. 84-87.

*Primary Examiner*—Gregory A. Heller
*Attorney, Agent, or Firm*—R. E. Elden; F. Ianno; E. G. Seems

[57] ABSTRACT

The invention is a process to purify a solution of phosphoric acid by removing transition metal impurities such as iron, chromium and vanadium. In the process a solution of phosphoric acid in an organic solvent which is substantially immiscible with water is contacted with an aqueous solution of a salt of an alkali metal of phosphoric acid. The phosphoric acid recovered following the contacting contains a substantially lesser content of transition metal impurities.

12 Claims, No Drawings

PROCESS FOR PURIFYING PHOSPHORIC ACID

A process is provided for removing impurities from a solution of phosphoric acid. In particular, a process is provided for removing transition metal ions from a solution of phosphoric acid contained in an immiscible organic solvent.

Phosphoric acid is manufactured either by acid treatment of phosphate rock (the wet acid process) or by reducing phosphate rock in an electric furnace to elemental phosphorus which is burned to form a purer phosphoric acid (the furnace acid process). With escalating power rates the cost of producing elemental phosphorus has increased so that it is now economically desirable to purify wet process phosphoric acid for industrial purposes and for detergent builders.

In the wet acid process phosphoric acid is formed by the reaction of sulfuric acid on calcium phosphate rock and is separated from the resultant calcium sulfate by filtration. Fresh wet process phosphoric acid is supersaturated with a group of sludge-forming components (Fe, Al, Ca, Mg, Cu, F, Na, K, Si, and $SO_4$) that must be removed to produce high quality phosphate salts. This clean-up is difficult and always entails some loss of phosphate values. Chemical precipitation and solvent extraction are the main methods of purifying wet process acid. Solvent extraction is now the preferred process for purifying commercial wet process phosphoric acid purification units.

Solvent extraction is a relatively simple technique in theory. Wet process phosphoric acid is brought into intimate contact with a partially or substantially water-immiscible organic solvent, into which a majority of the phosphoric acid is extracted. After the two phases have been separated, the aqueous phase, or raffinate, which contains some phosphoric acid and most of the impurities, can often be used for the manufacture of fertilizers. The organic phase, however, contains very few of the impurities and the phosphoric acid that is subsequently extracted from the solvent has a much higher purity than the original wet process phosphoric acid.

In reality the process is not that simple. It is necessary, for example, to ensure that objectionable impurities in the solvent be removed prior to extracting the phosphoric acid and that solvent is recovered from both the raffinate and the purified acid. Further, three aspects that are of major importance are the choice of solvent, the impurities present in the acid, and, obviously, the specifications for the product acid.

Consequently, each commercial wet process phosphoric acid purification process employs a counter-current scrubber (a washing step) to remove some of the impurities which are contained in the organic phase prior to extracting the phosphoric acid therefrom. Usually the organic phase is scrubbed with either phosphoric acid or water. The liquor from the scrubber is then directed to the extractor to recover the phosphates contained therein by extraction into the solvent for recycle. A high volume of recycle from the scrubber is undesirable because the recycled phosphate ions must be reextracted into the organic phase, thus limiting the productivity of the extractor.

The present process overcomes the disadvantages of prior art processes, and is suitable for purifying phosphoric acid, such as wet process phosphoric acid, by reducing the concentration of ions of transition metals therein, said ions of transition metals being selected from the group consisting of iron, chromium and vanadium, by incorporating phosphoric acid into a substantially water-immiscible organic solvent to form an organic solution of phosphoric acid, and recovering purified phosphoric acid by extracting phosphoric acid from the organic solution of phosphoric acid with an aqueous solution, the improvement comprising contacting a sufficient quantity of organic solution of phosphoric acid with an aqueous solution of an alkali metal salt of phosphoric acid (a) to provide an O/A volume ratio of about 20 to 70 parts of organic solvent per part of aqueous solution, and (b) to provide at least 0.03 mols of alkali metal ions in the aqueous solution per mol of phosphoric acid in the organic solution, thereby extracting ions of said transition metals from the organic solution into the aqueous solution of an alkali metal salt of phosphoric acid, and separating the aqueous solution of an alkali metal salt from the organic solution.

It is well known that impurities in wet process phosphoric acid are generally reduced by solvent extraction processes. However, the transition ions, iron, chromium and vanadium are particularly difficult to remove sufficiently to meet exacting specifications. It is wholly unexpected to find present invention preferentially removes these specific transition metal ions. For example, U.S. Pat. No. 4,255,568 to Leveque teaches a process for preferentially removing sulfuric acid (sulfate ions) from a solution of phosphoric acid in an organic solvent by scrubbing the organic solution in at least two counter-current stages with a scrubbing solution containing a pH increasing amount of an alkali metal or ammonium compound. The alkali metal or ammonium compound is necessary to neutralize the sulfuric acid in a solvent to a bisulfate salt. The present invention unexpectedly reduces the concentration of iron, chromium and vanadium ions in the organic solvent to a greater degree than the sulfuric acid. Even more surprising, the present invention is effective in reducing the iron, chromium and vanadium by contacting the organic solution of phosphoric acid with an aqueous solution of an alkali metal salt of phosphoric acid without employing the multiple stage counter-current contacting means of U.S. Pat. No. 4,255,568. One skilled in the art will readily recognize that other ions, including transition metal ions, will be removed from the organic solution by this process.

The alkali metal salt of phosphoric acid can be supplied as monosodium phosphate, monopotassium phosphate, disodium phosphate, dipotassium phosphate, trisodium phosphate or tripotassium phosphate. Alternatively, the alkali metal salt of phosphoric acid may be supplied by incorporating sodium hydroxide, potassium hydroxide or an alkali metal carbonate into the aqueous solution as phosphoric acid will be extracted from the organic solution into the aqueous solution to form the alkali metal salt of phosphoric acid. It is desirable to employ an alkali metal salt of phosphoric acid in the aqueous solution, such as monosodium phosphate or monopotassium phosphate, to avoid decreasing the concentration of phosphoric acid in the organic solution.

The quantity of alkali metal ions required in the aqueous solution is dependent upon the quantity of phosphoric acid in the organic solution. Generally, the organic solution contains from about 10% to 20% phosphoric acid. At least 0.03 mols of alkali metal ions should be provided in the aqueous solution per mol of phosphoric acid in the organic solution. The efficacy of the process in removing transition metal ions increases as the concentration of alkali metal increases; however, more phosphoric acid is extracted from the organic solution. It is preferable to provide between 0.03 and 0.09 mols of alkali metal per mol of phosphoric acid in the organic solution.

The concentration of the alkali metal salt of phosphoric acid in the aqueous solution can be varied over a wide range, however, as the concentration is decreased a greater quantity of aqueous solution is required to provide sufficient alkali metal ions, and as a result a greater quantity of phosphoric acid will be extracted from the organic solution. When the ratio of organic solvent to aqueous solution (O/A ratio) drops to less than 20 the phosphoric acid losses are excessive. As the O/A ratio increases, the concentration of the alkali metal salt of phosphoric acid in the aqueous solution must be increased until the solubility limit is reached. An O/A ratio of 70 is the practical maximum. It is preferable that the O/A ratio be maintained between 30 and 60. The O/A ratio as used herein is defined as the ratio of the volume of water-immiscible solvent contained in organic solution divided by the volume of aqueous solution of an alkali metal salt of phosphoric acid.

An advantage of the present process is that it is not necessary to employ expensive multi-stage counter-current apparatus to reduce the impurity level substantially. However, it is not contemplated that the present process should exclude the use of multi-stage apparatus if convenient. A single-stage scrubber apparatus is desirable because of the reduced operating and capital costs. A particularly preferred scrubber apparatus is a commercial static mixer combined with a decanter. A static mixer is much simpler and less costly than the conventional multi-stage, counter-current devices. A static mixer is a pipe section containing a series of elements that cause turbulence and mixing when fluids are pumped through. A static mixer has no internal moving parts. A decanter also has no moving members and allows coalescing of the phases from the static mixer. The velocity through a static mixer is a very important parameter since it defines the mixing intensity, entrainment, drop size, and overall performance. The static mixer produces a dispersion of drops of a first phase dispersed in a second continuous phase (usually solvent) thereby facilitating the metal ion removal. A static mixer is uniquely suited to produce drops in a narrow size range which is desirable. To achieve best operation, the smallest possible drops are desirable. However, drops below a critical size are very difficult to separate and are likely to become entrained in the continuous phase causing a poor metals removal. One skilled in the art can readily select the optimum operating conditions to provide the optimum drop size without undue experimenting.

The best mode of practicing the invention will be clear from the following nonlimiting examples. Although the invention is exemplified with the sodium salt of phosphoric acid as the aqueous solution, it is clear that any alkali metal such as potassium may be employed.

EXAMPLE 1

Solutions containing 520 g tributyl phosphate and 103 g (16.5%) wet process phosphoric acid were stirred with 50 ml of an aqueous solution (O/A ratio=10) containing 0%, 5% and 10% NaOH respectively. The concentration of iron, chromium and vanadium was determined by atomic absorption spectroscopy. The results are presented as Table I.

EXAMPLE 2

Laboratory batch mixer/settler studies were made using 1200 g to 1600 g of tributyl phosphate loaded with 16.5% $H_3PO_4$ mixed with 40 g of aqueous solution at an O/A ratio of 30/1 to 40/1. A jacketed, agitated two-liter flask was used to mix the phases for one hour and then the system settled for one hour at 50° C. The results are presented as Table II in which the iron and sulfate content of the feed organic solution "before" is compared with the washed organic solution "after".

Example 2 demonstrates the efficacy of the present process for reduction of the iron content of the organic solution is at least three times the efficacy for removing sulfate over the Na/P range of 0.03 to 0.07.

EXAMPLE 3

A continuous pilot study was made employing a commercial Chemineer-Kenics ™ brand static mixer with 24 elements which had a 1 cm (¼") ID with a length-/diameter ratio of 1.5. The decanter was 16 cm (6") in diameter and 75 cm (30") long. The feed rates were held constant with tributyl phosphate containing 18.3% $H_3PO_4$ mixed with aqueous feed of 0% to 20% NaOH or 47% wt. monosodium phosphate (MSP) at O/A ratio of 30/1 to 60/1. The system was at 50°C. until steady state was reached. The results are presented as Table III.

The example demonstrates that the alkali metal salt of phosphoric acid may be provided either by the salt itself, such as monosodium phosphate, or by a compound which will react with phosphoric acid to form the salt in situ.

Unexpectedly, it was observed that when water was employed alone as the aqueous phase for a comparison that at mixing rates of more than 1 meter/second an emulsion was formed which would not separate on standing.

TABLE I

| REMOVAL OF Fe, Cr AND V FROM AN ORGANIC SOLUTION OF PHOSPHORIC ACID | | | | | |
|---|---|---|---|---|---|
| Scrubbing | Ratios | | mg/l | | |
| Solution | O/A | Na/P | Fe | Cr | V |
| Water | 10 | 0 | 3.6 | 0.27 | 1.0 |
| 5% NaOH | 10 | 0.07 | 2.6 | 0.09 | <0.3 |
| 10% NaOH | 10 | 0.14 | 0.5 | 0.05 | <0.3 |
| ORGANIC SOLUTION FEED | | | 37 | 2.8 | 13 |

TABLE II

| EFFICACY IRON REMOVAL COMPARED WITH SULFATE REMOVAL | | | | | | |
|---|---|---|---|---|---|---|
| Solvent | | Loaded | | ppm Fe | | ppm SO4 |
| Stripped With: | Na/P | Soln. (g) | O/A | Before | After | Before After |
| Water | .000 | 1200 | 30/1 | 56 | 15 | 4300 3100 |
| 7% NaOH | .034 | 1200 | 30/1 | 62 | 6 | 4000 1500 |
| 20% NaOH | .074 | 1600 | 40/1 | 59 | 3 | 3800 700 |

TABLE III

PILOT STUDY EMPLOYING A STATIC MIXER AND COMPARING NaOH AND MONOSODIUM PHOSPHATE (MSP) AQUEOUS SOLUTION

| | Na/P | Velocity in m/s | O/A | ppm Fe Before | ppm Fe After | ppm SO$_4$ Before | ppm SO$_4$ After |
|---|---|---|---|---|---|---|---|
| Run A (Water) | .000 | 1.0 | 38 | 43 | 22 | 2300 | 2400 |
| Run B (16% NaOH) | .058 | 1.3 | 59 | 59 | 17 | 7200 | 3600 |
| Run C (15% NaOH) | .071 | 1.7 | 31 | 76 | 14 | 5600 | 1600 |
| Run D (47.5% MSP) | .049 | 1.3 | 68 | 45 | 13 | 3500 | 1800 |

We claim:

1. In a process for purifying phosphoric acid by reducing the concentration of ions of transition metals therein, said ions of transition metals being selected from the group consisting of iron, chromium and vanadium, by incorporating phosphoric acid into a substantially water-immiscible organic solvent to form an organic solution of phosphoric acid, and recovering purified phosphoric acid by extracting phosphoric acid from the organic solution of phosphoric acid with an aqueous solution, the improvement comprising contacting a sufficient quantity of organic solution of phosphoric acid with an aqueous solution of an alkali metal salt of phosphoric acid (a) to provide an O/A volume ratio of about 20 to 70 parts of organic solvent per part of aqueous solution, and (b) to provide at least 0.03 mols of alkali metal in the aqueous solution per mol of phosphoric acid in the organic solution, thereby extracting ions of said transition metals from the organic solution into the aqueous solution of an alkali metal salt of phosphoric acid, and separating the aqueous solution of an alkali metal salt from the organic solution.

2. The process of claim 1 wherein about 30 to about 60 parts of an organic solvent are employed to form an organic solution containing phosphoric acid.

3. The process of claim 1 wherein the alkali metal solution of phosphoric acid is present in sufficient quantity to provide about 0.03 to about 0.09 mols of alkali metal per mol of phosphoric acid in the organic solution.

4. The process of claim 2 wherein the alkali metal solution of phosphoric acid is present in sufficient quantity to provide about 0.03 to about 0.09 mols of alkali metal per mol of phosphoric acid in the organic solution.

5. In a process for purifying phosphoric acid by reducing the concentration of ions of transition metals therein, said ions of transition metals being selected from the group consisting of iron, chromium and vanadium, by incorporating phosphoric acid into a substantially water-immiscible organic solvent to form an organic solution of phosphoric acid, and recovering purified phosphoric acid by extracting phosphoric acid from the organic solution of phosphoric acid with an aqueous solution, the improvement comprising contacting a sufficient quantity of organic solution of phosphoric acid with an aqueous solution of an alkali metal salt of phosphoric acid in a single-stage contacting means (a) to provide an O/A volume ratio of about 20 to 70 parts of organic solvent per part of aqueous solution, and (b) to provide at least 0.03 mols of alkali metal in the aqueous solution per mol of phosphoric acid in the organic solution, thereby extracting ions of said transition metals from the organic solution into the aqueous solution of an alkali metal salt of phosphoric acid, and separating the aqueous solution of an alkali metal salt from the organic solution.

6. The process of claim 5 wherein about 30 to about 60 parts of an organic solvent are employed to form an organic solution containing phosphoric acid.

7. The process of claim 5 wherein the alkali metal solution of phosphoric acid is present in sufficient quantity to provide about 0.03 to about 0.09 mols of alkali metal per mol of phosphoric acid in the organic solution.

8. The process of claim 5 wherein the alkali metal solution of phosphoric acid is present in sufficient quantity to provide about 0.03 to about 0.09 mols of alkali metal per mol of phosphoric acid in the organic solution.

9. The process of claim 5 wherein the single-stage contacting means is a static mixer.

10. The process of claim 6 wherein the single-stage contacting means is a static mixer.

11. The process of claim 7 wherein the single-stage contacting means is a static mixer.

12. The process of claim 8 wherein the single-stage contacting means is a static mixer.

* * * * *